(12) United States Patent
Cano Cediel et al.

(10) Patent No.: US 9,242,438 B2
(45) Date of Patent: Jan. 26, 2016

(54) TAPE LAYING TOOL AND METHOD USED IN MANUFACTURING COMPOSITE MATERIAL PARTS

(71) Applicant: AIRBUS OPERATIONS S.L., Madrid (ES)

(72) Inventors: José David Cano Cediel, Madrid (ES); Ruth Chinarro Vera, Madrid (ES); Francisco Escobar Benavides, Madrid (ES); Pedro Nogueroles Viñes, Madrid (ES)

(73) Assignee: AIRBUS OPERATIONS S.L., Madrid (ES)

( * ) Notice: Subject to any disclaimer, the term of this patent is extended or adjusted under 35 U.S.C. 154(b) by 63 days.

(21) Appl. No.: 14/039,122

(22) Filed: Sep. 27, 2013

(65) Prior Publication Data
US 2014/0090772 A1    Apr. 3, 2014

(30) Foreign Application Priority Data
Sep. 28, 2012  (ES) .................................. 201231504

(51) Int. Cl.
*B29C 70/32*    (2006.01)
*B32B 37/02*    (2006.01)

(52) U.S. Cl.
CPC ................. *B32B 37/02* (2013.01); *B29C 70/32* (2013.01); *Y10T 156/1043* (2015.01)

(58) Field of Classification Search
None
See application file for complete search history.

(56) References Cited

U.S. PATENT DOCUMENTS

| | | | | |
|---|---|---|---|---|
| 4,401,495 | A | * | 8/1983 | McKinney .................... 156/173 |
| 2012/0000597 | A1 | * | 1/2012 | Astwood et al. .............. 156/194 |

* cited by examiner

*Primary Examiner* — Barbara J Musser
(74) *Attorney, Agent, or Firm* — Ingrassia Fisher & Lorenz, P.C.

(57) ABSTRACT

A method of manufacturing composite material parts is provided. The method includes tape laying by means of fiber placement on the outer surface of a tape laying tool, such that at least one laminate with a geometry different from the end geometry of the part is obtained and forming the at least one laminate obtained in tape laying by means of a forming tool, such that the laminate acquires the end geometry of the part. The method also includes curing the at least one part.

16 Claims, 4 Drawing Sheets

TAPE LAYING TOOL AND METHOD USED IN MANUFACTURING COMPOSITE MATERIAL PARTS

CROSS-REFERENCE TO RELATED APPLICATION

This application claims priority to Spanish Patent Application No. P201231504, filed Sep. 28, 2012, which is incorporated herein by reference in its entirety.

TECHNICAL FIELD

This application pertains to a method for manufacturing composite material parts having an open section and a tape laying device for laying up said parts, using band placement technology, whereby an increase in the production rate with respect to the methods used today and an increase in the dimensional quality of the obtained parts are achieved. In order to achieve this objective, the device includes a configuration which allows laying up more than one laminate at the same time, obtaining with said tape laying at least one laminate with a geometry different from the geometry of the end part which is subjected to subsequent forming, providing the end geometry to the part. It applies in the technical field of composite material part manufacture, particularly in the aeronautics industry.

BACKGROUND

In modern aeronautics, composite materials are very often used in manufacturing various aircraft parts. Such materials, having very specific properties, allow producing light, strong and durable aircraft parts.

There are several methods for manufacturing composite material parts, among which flat or slightly curved tape laying (ATL, Automated Tape Lay up) and fiber placement (FP) for parts with a great curvature can be highlighted.

Generally, flat parts or parts with a slight curvature are manufactured by means of ATL technology. These parts are then directly cured, if the geometry of the part after tape laying is the same as the end geometry, otherwise they are subjected to forming for obtaining the end geometry before being subjected to a curing cycle.

To manufacture parts having symmetry of revolution or a complicated geometry, FP techniques, tape laying by means of a movable head and on a tool rotating with respect to an axis, are used.

By means of the FP technique used today, a laid up part with a geometry similar enough to the end geometry is obtained so as to enable subjecting it to a curing cycle without needing intermediate forming. To that end, the tape laying tool has an outer surface that corresponds to the end geometry of the desired part.

As is known, the FP technique is a process in which bands of pre-impregnated material are arranged on a tape laying tool, a part with a previously established geometry being obtained. For placing the bands on the surface of the tool, a robotic arm which moves along the mentioned tool is used, which together with the rotation of the tool, allows positioning the bands of pre-impregnated material in the desired position and orientation. In the FP technique used today, once a band is placed, it must be cut and the robotic arm must then be repositioned to again initiate the positioning of another new band in another specific direction. Ultimately, this system of manufacturing composite material parts involves stopping and repositioning the robotic arm as well as the tape laying tool on which the bands of pre-impregnated material are positioned every time the end of a band section is reached.

In parts having an open section, the bands of pre-impregnated material used in tape laying are shorter than the bands used in laying up parts having a closed section, so the number of stops made by the machine is high, which entails greater time losses.

The production rate is limited with the FP technology used today because since the tape laying tool has the end geometry of the part, only one part can be laid up every time tape laying is performed.

In addition, other objects, desirable features and characteristics will become apparent from the subsequent summary and detailed description, and the appended claims, taken in conjunction with the accompanying drawings and this background.

SUMMARY

The objective of the various teachings of the present disclosure is to develop a method for obtaining open parts that increases the productivity and flexibility of the current process, obtaining parts with higher dimensional quality. This is achieved by means of the combination of tape laying by means of FP on a tape laying tool with a geometry different from the geometry of the end part to be obtained in which the angles between sides are greater than in the end part, followed by subsequent forming whereby the end geometry of the part is obtained.

Accordingly, the present disclosure describes a method and a new tape laying device for laying up composite material parts using the fiber placement technique.

The method of manufacturing composite material parts that are the subject of the present disclosure comprises a first step and a second step.

The first step of the method comprises tape laying by means of fiber placement (FP) on the outer surface of a tape laying tool, such that at least one laminate with a geometry different from the end geometry of the part is obtained and forming the laminate obtained in the preceding process by means of a forming tool, such that the end geometry of the part is acquired.

The second step comprises curing the at least one part obtained in the first step.

In one embodiment of the method of manufacturing composite material parts according to the present disclosure, during the tape laying of the first step, the robotic arm continuously lays bands of pre-impregnated material covering the entire outer surface of the tape laying tool, a single laminate being obtained, which is then cut for obtaining at least two laminates with geometries different from the end geometry of the part, which laminates will become individual parts after forming.

In one embodiment of the method of manufacturing composite material parts according to the various teachings of the present disclosure, during the tape laying of the first step the robotic arm lays bands of pre-impregnated material around the outer surface of the tape laying tool individually for each laminate which will then form a part, cutting and repositioning of said arm being required upon reaching the end of each band forming part of a layer of a laminate. In one embodiment of the method of manufacturing composite material parts according to the present disclosure, the tape laying tool has a geometry such that it allows laying up at least one laminate with the end geometry of the part without needing to perform a subsequent forming step before curing the part.

In the method of manufacturing composite material parts, an adherent layer is applied on the outer surface of the tape laying tool before tape laying.

The cross-section of the tape laying tool used in the first step is a polygonal section which allows obtaining several laminates simultaneously. Said section can be a regular polygon or an irregular polygon, depending on whether or not the manufactured parts are the same.

In one exemplary embodiment of the present disclosure, the sides of said polygon are curved and the corners between said sides are rounded.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 9:
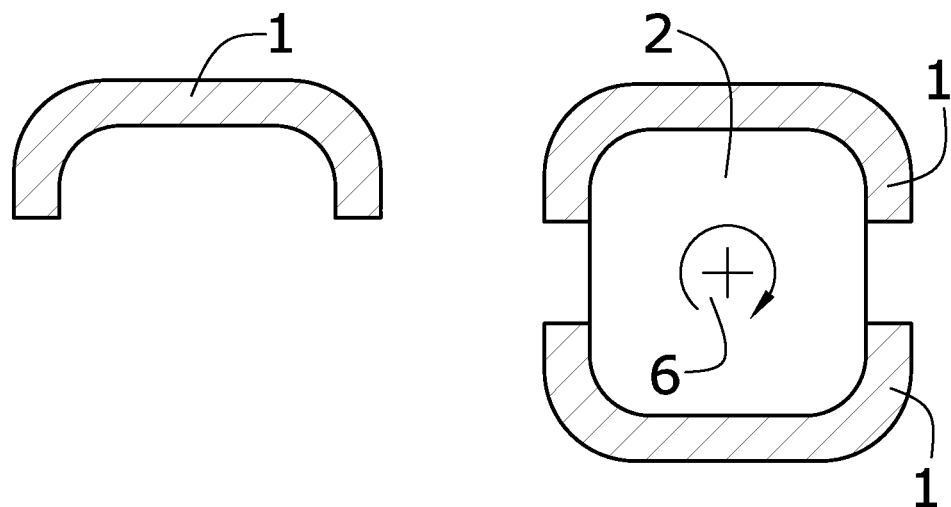
FIG. 9 shows a U-shaped part on a tape laying tool wherein the corners between their sides are rounded.

FIG. 9 shows a U-shaped part on a tape laying tool wherein the corners between their sides are rounded.

Figure 10:
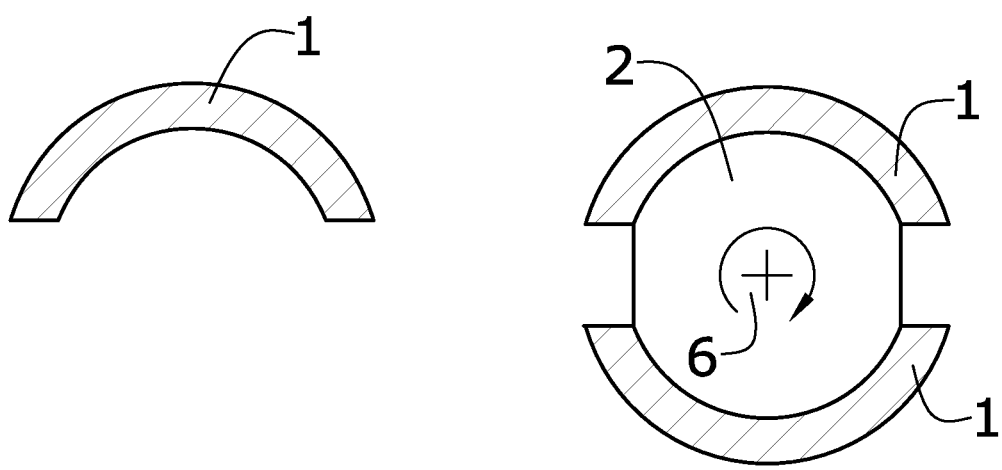
FIG. 10 shows a U-shaped part on a tape laying tool comprised curved sides.

FIG. 10 shows a U-shaped part on a tape laying tool comprised curved sides.

The following detailed description is merely exemplary in nature and is not intended to limit the present disclosure or the application and uses of the present disclosure. Furthermore, there is no intention to be bound by any theory presented in the preceding background or the following detailed description.

Figure 1:
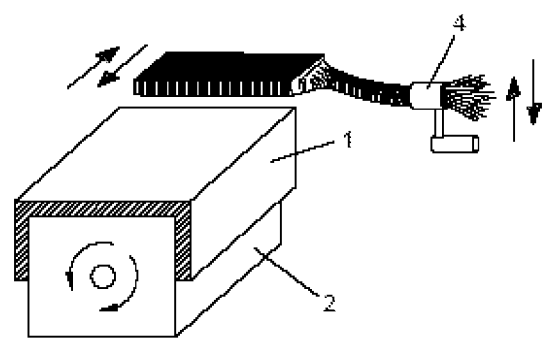
FIG. 1 is a schematic drawing of the process of laying up U-shaped parts by means of conventional FP.
Figure 2:
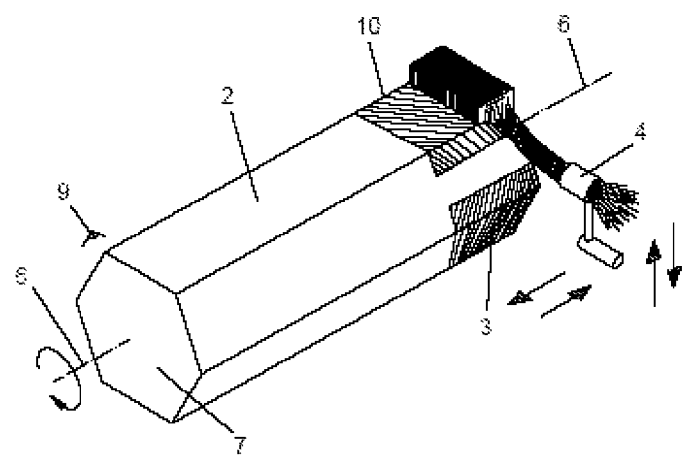
FIG. 2 shows a diagram of laying up three laminates at the same time by means of the process of the present disclosure according to various embodiments.
Figure 3:
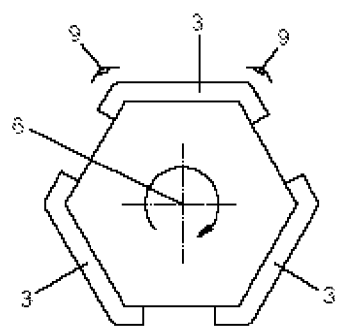
FIG. 3 shows a view of the cross-section of a hexagonal tape laying tool used in manufacturing U-shaped parts by means of the method of the present disclosure, according to various embodiments, with three laminates around it.

As mentioned, the fiber placement (FP) technique is a process known in the state of the art, particularly suitable for manufacturing parts (1) with a double curvature. In the FP technique, a robotic arm (4) places bands of pre-impregnated material (10) on an outer surface of a tape laying tool (2) which replicates the geometry of the part to be manufactured. An example of this process can be seen in FIG. 1. Before the robotic arm (4) starts placing the bands of pre-impregnated material (10) on the tape laying tool (2), an adherent layer is applied on the outer surface of the tape laying tool (2) which is rotating about its axis (6). The objective of this adherent layer is to suitably fixed the composite material part (1) on said outer surface of the tape laying tool (2), preventing unwanted movements of the bands of pre-impregnated material (10) during the positioning thereof.

The various teachings of the present disclosure proposes a method for manufacturing composite material parts (1) having an open section by means of the fiber placement technique, increasing the productivity and the dimensional quality of the obtained parts with respect to the method used until now.

The method according to various embodiments of the present disclosure comprises two steps. The first step comprises tape laying by means of fiber placement (FP) on the outer surface of a tape laying tool (2), such that at least one laminate (3) with a geometry different from the end geometry of the part (1) is obtained and forming said laminates individually on a forming tool (11) such that they acquire the end geometry of the part (1). The second step comprises curing the parts (1) obtained in the preceding step.

The method according to various embodiments allows higher manufacturing productivity and flexibility since it allows laying up a different number of laminates (3), depending on the particular needs of each production period, with one and the same suitably designed tape laying tool (2).

Figure 6:
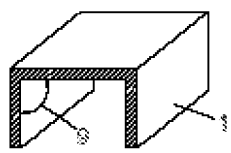
FIG. 6 shows a U-shaped part according to various embodiments.
Figure 6A:
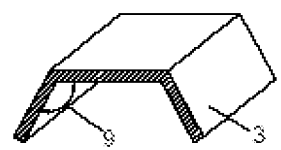
FIGS. 6A and 6B illustrate the two possibilities offered by the method according to various teachings of the present disclosure for manufacturing U-shaped parts: in the case of FIG. 6A, the first step comprises tape laying in which a laminate with a geometry different from the end geometry is obtained and a subsequent forming in which said laminate is given the end geometry of the part, whereas a tape laying tool with the end geometry of the part is used in FIG. 6B for obtaining a laminate with said geometry without needing subsequent forming.
Figure 6A:
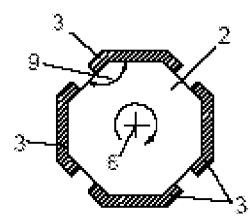
Figure 6B:
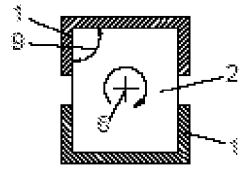
Figure 8:
FIG. 8 shows another type of part that can be manufactured with the method according to the various teachings of the present disclosure and the tool used for tape laying.
Figure 8:
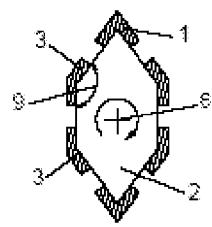

The section (7) of the tape laying tool (2) used is a polygonal section, being able to be a regular polygon for manufacturing parts (1) with an identical geometry (as can be seen in FIGS. 6A and 6B), or an irregular polygon for manufacturing parts (1) with different geometries (as can be seen in FIG. 8). In one exemplary embodiment of the present disclosure, it is important to point out the possibility of the polygonal cross-section of the tool (7) being able to have both curved sides and fillet radii between the sides for parts (1) requiring these geometries.

The first step of the method according to various embodiments offers two possibilities: laying up a smaller number of laminates (3), directly acquiring their end geometry, or laying up a greater number of laminates (3) with a geometry different from the end geometry, but requiring subsequent forming of each of the laminates (3) for obtaining the end geometry.

Choosing one option or another when performing the first tape laying step depends on the composite material part (1) production needs of the manufacturing plant.

Figure 4:
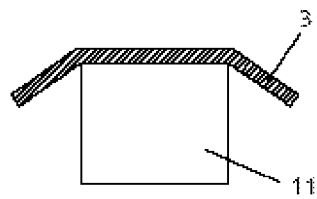
FIG. 4 shows a view for the case of U-shaped parts of a laid up laminate positioned on the tool used for forming after tape laying according to various embodiments.
Figure 5:
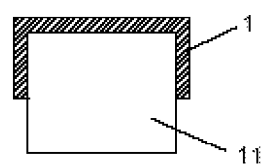
FIG. 5 shows a view such as that described in FIG. 4, but with the resulting part after the forming process according to various embodiments.

For U-shaped parts such as that shown in FIG. 6, these two possibilities are illustrated in FIGS. 6A and 6B, together with FIGS. 4 and 5 illustrating the subsequent forming step.

The first option illustrated in FIG. 6A comprises laying up four laminates (3) with a geometry different from the geometry of the end part by means of a tape laying tool with an octagonal section (2), such that the angles (9) between the sides of the laminates are greater than in the end part (1), followed by individual forming of said laminates (3), illustrated in FIGS. 4 and 5, by means of a forming tool with a square section (11) providing each laminate with the end geometry of the part (1). This forming operation is quick and requires little energy. Since the angles (9) to be bent during tape laying have been marked with fold lines and significant deformation is not required, laminates (3) with a dimensional quality suited to the needs of the aeronautics industry are obtained.

The second option illustrated in FIG. 6B comprises laying up two laminates (3) with the end geometry of the part (1) by means of using a tape laying tool (2) with a rectangular section, without needing subsequent forming.

In both cases, the second step of the method comprises a curing cycle for curing the parts (1) obtained in the preceding step.

The dimensional quality of the parts obtained by means of the method according to the presend disclosure is higher than by means of the current method since the forming step after tape laying provides better dimensional tolerances than those obtained by means of a process of tape laying by means of conventional FP.

Figure 7:
FIG. 7 shows a U-shaped part with wings at the free ends of said U-shaped section.
Figure 7A:
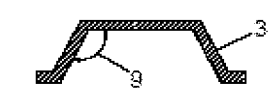
FIGS. 7A and 7B, similar to FIGS. 6A and 6B, show the two possibilities offered by the method according to the various teachings of the present disclosure for manufacturing parts such as that shown in FIG. 7.
Figure 7A:
Figure 7B:
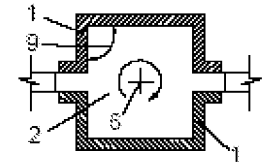

FIGS. 7A and 7B show the same possibilities offered by the method according to the present disclosure for the type of parts illustrated in FIG. 7.

FIG. 8 shows another configuration that the laminates (3) can adopt, in which the angles (9) between the sides are acute angles and the section of the tape laying tool (2) which is used in the first step of the method. This section allows the simultaneous laying up of up to six laminates (3), two of them with the acute angle (9) between sides, and the other four laminates (3) with the obtuse angle (9).

FIG. 9 shows another embodiment of a tape lying tool. In this figure, a U-shaped part (1) is mounted on a tape laying tool (2) which is rotating about an axis (6). In this particular embodiment, corners between the sides of the tool are rounded.

FIG. 10 shows another embodiment of a tape lying tool. In this figure, a U-shaped part (1) is mounted on a tape laying tool (2) which is rotating about an axis (6). In this particular embodiment, the tape laying tool (2) comprised curved sides.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method of manufacturing composite material parts comprising:
    tape laying by means of fiber placement on the outer surface of a tape laying tool, such that at least one laminate with a geometry different from a geometry of an end part is obtained, the laminate comprising at least two sides defining at least one angle between them;
    separating the at least one laminate from the tape laying tool and placing it on a forming tool forming the at least one laminate obtained in tape laying by means of the forming tool which is different from the tape laying tool and has a different shape from the tape laying tool, such that the at least one laminate acquires the geometry of the end part;
    curing the at least one laminate.

2. The method of manufacturing composite material parts according to claim 1, wherein in the geometry of the at least one laminate which is obtained in the tape laying the angles between the sides of the at least one laminate are greater than the angles between the sides in the geometry of the end part.

3. The method of manufacturing composite material parts according to claim 1, wherein before tape laying, an adherent layer is applied on the outer surface of the tape laying tool.

4. The method of manufacturing composite material parts according to claim 1, further comprising a tape laying tool having a cross-section that allows obtaining several laminates simultaneously during the tape laying by means of fiber placement.

5. The method of manufacturing composite material parts according to claim 4, wherein the cross-section of the tape laying tool is a regular polygon.

6. The method of manufacturing composite material parts according to claim 4 wherein the cross-section of the tape laying tool is an irregular polygon.

7. The method of manufacturing composite material parts according to claim 4, wherein the cross-section of the tape laying tool is a polygon in which the corners between its sides are rounded.

8. The method of manufacturing composite material parts according to claim 1, wherein the cross-section of the tape laying tool comprises curved sides.

9. A method of manufacturing composite material parts comprising:
    tape laying by means of fiber placement on the outer surface of a tape laying tool having a polygonal cross-section, such that at least one laminate with a geometry different from a geometry of an end part is obtained;
    separating the at least one laminate from the tape laying tool and placing it on a forming tool forming the at least one laminate obtained in tape laying by means of the forming tool, such that the at least one laminate acquires the geometry of the end part, wherein the forming tool is different from the tape laying tool and has a different shape from the tape laying tool;
    then, curing the at least one laminate.

10. The method of manufacturing composite material parts according to claim 9, wherein in the geometry of the at least one laminate which is obtained in the tape laying, the angles between a first plurality of sides of the at least one laminate are greater than a second plurality angles between the first plurality of sides in the geometry of the end part.

11. The method of manufacturing composite material parts according to claim 9, wherein before tape laying, an adherent layer is applied on the outer surface of the tape laying tool.

12. The method of manufacturing composite material parts according to claim 9, wherein the cross-section of the tape laying tool allows obtaining several laminates simultaneously during the tape laying by means of fiber placement.

13. The method of manufacturing composite material parts according to claim 9, wherein the cross-section of the tape laying tool is a regular polygon.

14. The method of manufacturing composite material parts according to claim 9, wherein the cross-section of the tape laying tool is an irregular polygon.

15. The method of manufacturing composite material parts according to claim 9, wherein the cross-section of the tape laying tool is a polygon in which the corners between its sides are rounded.

16. The method of manufacturing composite material parts according to claim 9, wherein the cross-section of the tape laying tool comprises curved sides.

\* \* \* \* \*